US010242203B2

(12) United States Patent
Shetty et al.

(10) Patent No.: US 10,242,203 B2
(45) Date of Patent: Mar. 26, 2019

(54) FORMAT PRESERVATION BASED MASKING SYSTEM AND METHOD

(71) Applicant: Tata Consultancy Services Limited, Mumbai (IN)

(72) Inventors: Nisha Ravindra Shetty, Pune (IN); Ashim Roy, Pune (IN); Rahul Krushna Ghodeswar, Pune (IN); Ashvini Sakharam Mandpe, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 262 days.

(21) Appl. No.: 15/019,743

(22) Filed: Feb. 9, 2016

(65) Prior Publication Data

US 2017/0132420 A1 May 11, 2017

(30) Foreign Application Priority Data

Nov. 7, 2015 (IN) .......................... 4244/MUM/2015

(51) Int. Cl.
*G06F 21/60* (2013.01)
*G06F 21/62* (2013.01)
*H04L 9/00* (2006.01)
*G09C 1/04* (2006.01)
*H04L 9/06* (2006.01)

(52) U.S. Cl.
CPC ........ *G06F 21/602* (2013.01); *G06F 21/6254* (2013.01); *G09C 1/04* (2013.01); *H04L 9/00* (2013.01); *G06F 2221/2125* (2013.01); *H04L 9/0618* (2013.01); *H04L 2209/04* (2013.01); *H04L 2209/42* (2013.01)

(58) Field of Classification Search
CPC ..... G06F 21/60; G06F 21/6227; H04L 9/0618
USPC ......................................................... 713/189
See application file for complete search history.

(56) References Cited

U.S. PATENT DOCUMENTS

| 5,929,792 | A | * | 7/1999 | Herriot | ............... | G06F 17/2217 |
| | | | | | | 341/55 |
| 7,864,952 | B2 | | 1/2011 | Pauker et al. | | |
| 8,458,487 | B1 | | 6/2013 | Palgon et al. | | |
| 8,855,296 | B2 | | 10/2014 | Pauker et al. | | |

(Continued)

OTHER PUBLICATIONS

Hewlett Packard Enterprise. (2016). "HPE Security—Data Security," located at <https://www.voltage.com/products/data-security/hpe-securedata-enterprise/> visited on Feb. 9, 2016. (10 pages).

*Primary Examiner* — Eleni A Shiferaw
*Assistant Examiner* — Bryan F Wright
(74) *Attorney, Agent, or Firm* — Finnegan, Henderson, Farabow, Garrett & Dunner LLP (57) ABSTRACT

A computer implement format preservation based masking system and method is provided. The system obtains a first set of letters and a private key, and encrypts the first set of letters to obtain an encrypted letters list using the first set and private key. The encrypted letters list comprises a set of encrypted letters. A dynamic map is generated based on the encrypted letters, which includes one or more keys, each key being specific to a letter in the first set letters. A position of each of maskable letters in a second set of letters is calculated using the dynamic map, and performs masking of the maskable letters based on the position of each of the maskable letters to obtain masked data using the dynamic map.

18 Claims, 5 Drawing Sheets

(56) References Cited

U.S. PATENT DOCUMENTS

| | | | |
|---|---|---|---|
| 2004/0101134 A1* | 5/2004 | Incarnato | G09C 1/04 |
| | | | 380/28 |
| 2009/0204631 A1* | 8/2009 | Pomroy | G06F 21/6227 |
| 2011/0113050 A1 | 5/2011 | Youn et al. | |
| 2012/0017078 A1 | 1/2012 | Reno et al. | |
| 2013/0046995 A1* | 2/2013 | Movshovitz | H04L 9/0618 |
| | | | 713/189 |
| 2014/0283089 A1* | 9/2014 | Arya | G06F 21/60 |
| | | | 726/26 |
| 2017/0214521 A1* | 7/2017 | Busch | H04L 9/0618 |

\* cited by examiner

| ORIGINAL DATA | MASKED DATA |
|---|---|
| STREET ADDRESS | STREET ADDRESS |
| 1297 Via Cola di Rie | 8326 Jux Dkmd pm Rky |
| 93091 Calle della Testa | 17114 Mdkcr ryobl Ziuec |
| 2017 Shinjuku-ku | 2427 Tdgleolw-mq |

FIG. 3A

| ORIGINAL DATA | MASKED DATA |
|---|---|
| MIN_SALARY | MIN_SALARY |
| 20080 | 21263 |
| 15000 | 10283 |
| 3000 | 2462 |

FIG. 3B

| ORIGINAL DATA | MASKED DATA |
|---|---|
| MIN_SALARY | MIN_SALARY |
| 20080 | 24648 |
| 15000 | 69628 |
| 3000 | 2746 |

FIG. 3C

| ORIGINAL DATA | MASKED DATA |
|---|---|
| CHINESE LETTERS | CHINESE LETTERS |
| ラリルレゥワ | ニータダキル |
| レゥワキヱ | 一タダキル |
| ヴヵケヴギズヂ | グリホオガミビ |

FIG. 3D

| ORIGINAL DATA | MASKED DATA |
| --- | --- |
| COUNTRY NAME | COUNTRY NAME |
| Argentina | Atwfdrouw |
| Australia | United Kingdom |
| Italy | Singapore |

FIG. 3E

FORMAT PRESERVATION BASED MASKING SYSTEM AND METHOD

PRIORITY CLAIM

This U.S. patent application claims priority under 35 U.S.C. § 119 to: India Application No. 4244/MUM/2015, filed on Nov. 7, 2015. The entire contents of the aforementioned application are incorporated herein by reference.

TECHNICAL FIELD

This disclosure relates generally to information privacy systems, and more particularly to a format preservation based masking system and method.

BACKGROUND

Several organizations unwittingly share production data for testing purposes in non-production environment. This increases the risk of data breach. Masking sensitive data is a heuristic approach that organizations adopt in order to comply with data privacy mandates. Current data masking tools have been used by organizations to share data in non-production environment in order to maintain high data utility and non-disclosure of customer sensitive data. These tools offer a variety of masking techniques that are capable of masking sensitive data to meet several data privacy expectations. However, these tools mask data by using a static predefined lookup for replacing the original data. Using such techniques (or tools), it is easy to reproduce (or decipher) the original data and hence it is less secure leading to compromise in utility and privacy. Further, existing solutions require data to be specified within a specific range.

Additionally, existing solutions work on physical look ups of original and masked data mapping, which requires a computing system to consume more disk space, and more time in terms of creating, updating and processing of the data in a presentable and secured format. It is therefore a challenge in maintaining consistency of data sharing at an enterprise level without disrupting the format of the data.

SUMMARY

Embodiments of the present disclosure present technological improvements as solutions to one or more of the above-mentioned technical problems recognized by the inventors in conventional systems. For example, in one embodiment, a format preservation based masking system is provided. A format preserving based masking system, comprising a memory storing instructions; a hardware processor coupled to the memory, wherein the hardware processor is configured by the instructions to: obtain an input set of letters and a private key from a user, encrypt a set of letters to obtain an encrypted letters list using the set of letters and the private key, wherein the encrypted letters list includes a set of encrypted letters, generate a dynamic map based on the encrypted letters list, wherein the dynamic map includes a set of keys, each key is specific to a letter in the set of letters, calculate a position of each of maskable letters in the input set of letters that are to be masked using the dynamic map, and perform masking of the maskable letters based on the position of each of the maskable letters to obtain masked data using the dynamic map.

The set of letters and the input set of letters comprises at least one of a character, a numeric, and a symbol. The set of letters and the input set of letters are selected from one or more languages. When the input set of letters comprises one or more numerals, the hardware processor is further configured by the instructions to: generate a Most Significant Bit (MSB) map for the one or more numerals, calculate a position of each of maskable letters in the input set of letters using the dynamic map and the MSB map, and perform masking of the maskable letters based on the position of each of the maskable letters to obtain masked data using the dynamic map and MSB map.

The hardware processor is further configured by the instructions to: determine an order of letters in the encrypted letters list, sort the encrypted letters list from the order of letters to obtain a sorted encrypted letters list, generate a dynamic map based on the sorted encrypted letters list, wherein the dynamic map comprises a set of keys and values, each key specific to at least one letter in the set of letters, and, each value comprises one or more rearranged letters to be masked from the set of letters, calculate a position of each of maskable letters in the input set of letters that are to be masked using the dynamic map, and perform masking of the maskable letters based on the position of each of the maskable letters to obtain masked data using the dynamic map. The dynamic map further comprises an index indicative of masked replace letter for each letter in the set of letters.

When the one or more numerals is indicative of a specified range, the maskable letters comprising the one or more numerals are masked within the specified range.

In another embodiment, a computer implemented format preservation based masking method is provided. The method, comprising: obtaining an input set of letters and a private key from a user; encrypting a set of letters to obtain an encrypted letters list using the set of letters and the private key, wherein the encrypted letters list comprises a set of encrypted letters; generating a dynamic map based on the encrypted letters list, wherein the dynamic map comprises a set of keys wherein each key is specific to a letter in the set of letters; calculating a position of each of maskable letters in the input set of letters that are to be masked using the dynamic map; and performing masking of the maskable letters based on the position of each of the maskable letters to obtain masked data using the dynamic map.

The set of letters and the input set of letters comprises at least one of a character, a numeric, and a symbol, and wherein the set of letters and the input set of letters are selected from one or more languages.

When the input set of letters comprises one or more numerals, the method comprising: generating a Most Significant Bit (MSB) map for the one or more numerals; calculating a position of each of maskable letters in the input set of letters using the dynamic map and the MSB map; and performing masking of the maskable letters based on the position of each of the maskable letters to obtain masked data using the dynamic map and the MSB map.

The method comprising: determining an order of letters in the encrypted letters list; sorting the encrypted letters list from the order of letters to obtain a sorted encrypted letters list; generating a dynamic map based on the sorted encrypted letters list, wherein the dynamic map comprises a set of keys and values, each key specific to at least one letter in the set of letters, and, each value comprises one or more rearranged letters to be masked from the set of letters; calculating a position of each of maskable letters in the input set of letters that are to be masked using the dynamic map; and perform masking of the maskable letters based on the position of each of the maskable letters to obtain masked data using the dynamic map.

In yet another embodiment, one or more non-transitory machine readable information storage mediums comprising one or more instructions is provided. The one or more instructions which when executed by one or more hardware processors causes obtaining an input set of letters and a private key from a user; encrypting a set of letters to obtain an encrypted letters list using the set of letters and the private key, wherein the encrypted letters list comprises a set of encrypted letters; generating a dynamic map based on the encrypted letters list, wherein the dynamic map comprises a set of keys wherein each key is specific to a letter in the set of letters; calculating a position of each of maskable letters in the input set of letters that are to be masked using the dynamic map; and performing masking of the maskable letters based on the position of each of the maskable letters to obtain masked data using the dynamic map.

The set of letters and the input set of letters comprises at least one of a character, a numeric, and a symbol, and wherein the set of letters and the input set of letters are selected from one or more languages.

When the input set of letters comprises one or more numerals, the one or more instructions which when executed by one or more hardware processors causes: generating a Most Significant Bit (MSB) map for the one or more numerals; calculating a position of each of maskable letters in the input set of letters using the dynamic map and the MSB map; and performing masking of the maskable letters based on the position of each of the maskable letters to obtain masked data using the dynamic map and the MSB map.

The one or more instructions which when executed by one or more hardware processors further causes: determining an order of letters in the encrypted letters list; sorting the encrypted letters list from the order of letters to obtain a sorted encrypted letters list; generating a dynamic map based on the sorted encrypted letters list, wherein the dynamic map comprises a set of keys and values, each key specific to at least one letter in the set of letters, and, each value comprises one or more rearranged letters to be masked from the set of letters; calculating a position of each of maskable letters in the input set of letters that are to be masked using the dynamic map; and perform masking of the maskable letters based on the position of each of the maskable letters to obtain masked data using the dynamic map. When the one or more numerals is indicative of a specified range, the maskable letters comprising the one or more numerals are masked within the specified range.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
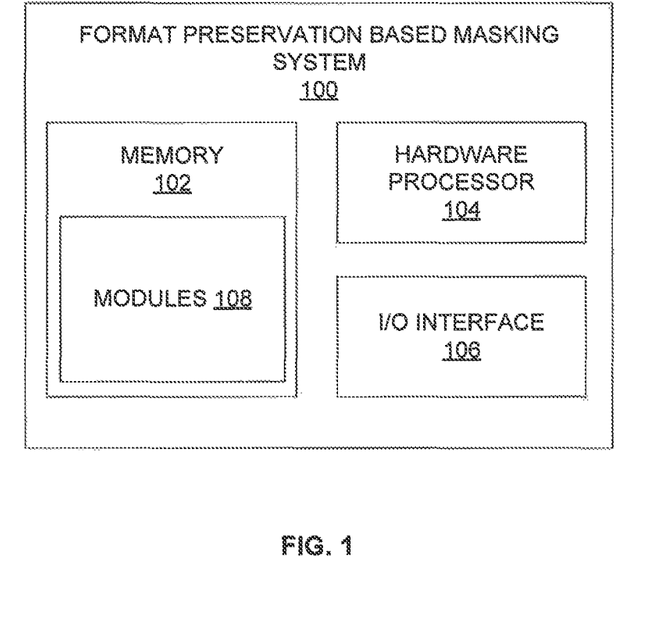
FIG. 1 illustrates a block diagram of a format preservation based masking system 100 according to an embodiment of the present disclosure.

FIG. 1 illustrates a block diagram of a format preservation based masking system 100 according to an embodiment of the present disclosure. The term "format preservation based masking system" and "system" may be interchangeably used herein. The format preservation based masking system 100 comprises a memory 102, a hardware processor 104, and an input/output (I/O) interface 106. The memory 102 further includes one or more modules 108 (or modules 108). The memory 102, the hardware processor 104, the input/output (I/O) interface 106, and/or the modules 108 may be coupled by a system bus or a similar mechanism.

The memory 102, may store instructions, any number of pieces of information, and data, used by a computer system, for example the format preservation based masking system 100 to implement the functions (or embodiments) of the present disclosure. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, applications, instructions or the like for enabling the format preservation based masking system 100 to carry out various functions in accordance with various example embodiments.

Additionally or alternatively, the memory 102 may be configured to store instructions which when executed by the hardware processor 104 causes the format preservation based masking system 100 to behave in a manner as described in various embodiments (e.g., dynamic map generation, masking of data, encrypting letters list, and sorting encrypted letters list, if any). The memory 102 stores information for example, information comprising at least one of letters, and the like. The letters comprises at least one of a character, a numeral, a symbol, or a whitespace/blank space. The character is at least one of an upper case, or a lower case. The letters comprises of one or more languages (e.g., English, Hindi, Kannada, Tamil, Telugu, Chinese, Japanese, and the like).

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among other things, a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

The hardware processor 104 is configured by the instructions stored in the memory 102. The hardware processor 104 when configured by the instructions obtains a set of letters and a private key as an input. The input may be obtained from one or more users, in one or more languages. The input may include a selection of letters from one or more languages through one or more input devices (e.g., multi-lingual keyboards) as described above. Consider, the set of letters (also referred herein as Charset), and a private key (also referred herein as "user key") as follows:

Set of letters={a, b, c, d, e, . . . x, y, z}
Private key='Key'

The hardware processor 104 is configured to receive an input set of letters (e.g. Name, Salary, Street address, etc.) from the user. The set of letters may be optional, in case, the format preservation based masking system 100 utilizes an English character keyboard, (e.g., in case of a client system using English keyboard). When the set of letters (may also be referred as first set of letters), and the input set of letters (a second set of letters) are non-English characters, the set of letters, and the input set of letters may be received as input from one or more input devices (e.g., Non-English keyboards or any virtual keyboard that is capable of providing Non-English letters). In one embodiment, the non-English letters may not be stored in the memory 102. The set of letters and input set of letters (from one or more languages) may (or may not) be stored in the memory 102. In another embodiment, the set of letters and the input set of letters (from one or more languages) can be obtained from one or more sources (e.g., cloud, remote servers, and/or third party sources), in real-time or near real-time. The hardware processor 104 is further configured by the instructions to encrypt the set of letters (e.g., the first set of letters) by using one or more encryption techniques. The hardware processor 104 performs encryption on the set of letters such that it accounts for the private key as one of the parameter. In other words, the hardware processor 104 encrypts the set of letters to obtain an encrypted letters list using the set of letters and the private key. The encrypted letters list comprises a set of encrypted letters as shown in below Table 1:

TABLE 1

| Set of letters (input) | Encrypted letters list |
|---|---|
| a | dcmn |
| b | edoi |
| c | fend |
| d | cbvf |
| e | baiu |

Post encryption, the hardware processor 104 checks whether the list contains sorted set of encrypted letters. When the encrypted letters list comprising a set of encrypted letters is found to be sorted in a particular order (e.g., an ascending order), the hardware processor 104 generates a dynamic map based on the set of encrypted letters without having to necessarily performing sorting. The dynamic map comprises a set of keys wherein each key is specific to a letter in the set of letters.

In case, the encrypted letters list comprising the set of encrypted letters is found to be in another particular order (e.g., an unacceptable order), the hardware processor 104 sorts the set of encrypted letters (e.g., unsorted encrypted letters), such that the format preservation based masking system 100 outputs a sorted encrypted letters list as shown in the below table 2:

TABLE 2

| Letters | Sorted encrypted letters |
|---|---|
| e | baiu |
| d | cvf |
| a | dcmn |
| c | edoi |
| b | fend |

Post sorting (if required), the hardware processor 104 then generates a dynamic map as shown in the below table 3:

TABLE 3

| Set of letters (input) | Output from dynamic map |
|---|---|
| a | e |
| b | d |
| c | a |
| d | c |
| e | b |

When the format preservation based masking system 100 outputs the sorted encrypted letters list, the dynamic map generated using the sorted encrypted letters list comprises a set of keys and values. Each value comprises one or more rearranged letters to be masked from the set of letters. The dynamic map generated will differ when there is a change in the private key. The hardware processor 104 is further configured to calculate a position of each of maskable letters in the input set of letters (e.g., the second set of letters such as, but not limited to, Name, Salary, Street address, etc.,) using the dynamic map, and perform masking of the maskable letters based on the position of each of the maskable letters to obtain masked data using the dynamic map. For example, the private key="My key", the masked data is as shown in the below table 4:

TABLE 4

| Set of letters (Original character) | Masked character |
| --- | --- |
| a | c |
| b | d |
| c | e |
| d | b |
| e | a |

Further, as described above, the dynamic map generated differs when there is a change the private key. For example, the private key="New Key", the masked data is as shown in the below table 5:

TABLE 5

| Set of letters (Original character) | Masked character |
| --- | --- |
| a | d |
| b | c |
| c | a |
| d | e |
| e | b |

As can be seen from the above tables 4 and 5, the format or the original letters (or characters) are preserved when the data is masked. The dynamic map comprises an index that is indicative of masked replace letter for each letter in the set of letters as can be seen from the above tables. The challenge remains when the input also comprises numerals (be it just numerals, or in combination of characters and symbols).

The embodiments of the present disclosure also resolves one of the major challenges in the above approach while generating unique numeric masked values. Consider the set of letters comprising of one or more numerals, the hardware processor 104 generates a Non-Most Significant Bit (MSB) map for the one or more numerals, calculates a position of each of maskable letters (or numerals in this case) in the encrypted letters list using the Non-MSB map (and the dynamic map already generated in case the input includes both characters and numerals). The encrypted letters comprises the set of letters and one or more numerals being encrypted. The hardware processor 104 then performs masking of the maskable letters (or numerals) based on the position of each of the maskable letters to obtain masked data. Considering the private key="Key", an illustrate example of masked data for one or more numerals (obtained as input), is as shown in the below table 6 (Non-MSB map table 6):

TABLE 6

| Original number | Masked number |
| --- | --- |
| 1 | 0 |
| 2 | 4 |

TABLE 6-continued

| Original number | Masked number |
| --- | --- |
| 3 | 1 |
| 4 | 3 |
| 0 | 2 |

On basis of this Non-MSB map, the masked value will be as shown in below table 7:

TABLE 7

| Original data | Masked data (when datatype is numeric) |
| --- | --- |
| 13 | 01 |
| 113 | 001 |
| 1113 | 001 |
| 11113 | 0001 |

The hardware processor 104 (or the format preservation based masking system 100) generates a Most Significant Bit (MSB) map for numeric datatype data. This MSB map is created for only for non-zero numbers. This will obtain and ensure consistent data without compromising its uniqueness. For example, consider the private key="Key", the MSB map is illustrated in the below table 8 (MSB map table 8):

TABLE 8

| Original number | Masked number |
| --- | --- |
| 1 | 4 |
| 2 | 3 |
| 3 | 2 |
| 4 | 1 |

On basis of the table 6 and table 8, map masked value will be as shown in below table

TABLE 9

| Original data | Masked data (if datatype is numeric) |
| --- | --- |
| 13 | 4 |
| 113 | 41 |
| 1113 | 441 |
| 11113 | 4441 |

From table 4, one can observe that though by making use of the dynamic map the masked value generation is secure. But, when a user understands the map formation for a particular key value then ascertaining the original data from the masked data is still possible. Therefore, to make the data masking more secure and consistent in data, the final masked output for any data depends on the position of the individual letters (characters, numeric, or symbols) in the data.

For better understanding of the embodiments of the present disclosure described herein, an example for dynamic map generation is discussed. Form dynamic map (A-Z, a-z, 0-9, user input numerals and alphabets). Here, the key is the original character whereas the value will contain: list-index of the masked character in the sorted masked array and the sorted masked array pointer. In parallel, form a map where the key is the sorted masked array pointer and the value is the sorted masked array. Masking of multilingual character is carried out by providing the user an option to import the non-English characters and the numerals other than [0-9]. These characters after getting imported undergo the same procedure of dynamic map formation and the masked value for the input data will depend on this map and the position of individual characters in the map.

Alternatively, the format preservation based masking system 100 may execute the modules comprising an input processing module that when executed by the hardware processor 104 obtains a set of letters and a private key (from a user by way of entry of letters from one or more input devices, for example, keyboard), and processes for encryption. The format preservation based masking system 100 may execute the modules comprising an encryption module that when executed by the hardware processor 104 encrypts letters to obtain an encrypted letters list using letters and private key. The format preservation based masking system 100 may execute the modules comprising a map generation module that when executed by the hardware processor 104 generates a dynamic map based on the set of encrypted letters. The format preservation based masking system 100 may execute the modules comprising a position calculation module that when executed by the hardware processor 104 calculates a position of each of maskable letters in the input set of letters using the dynamic map.

The format preservation based masking system 100 may execute the modules comprising a masking module that when executed by the hardware processor 104 performs masking of the maskable letters based on the position of each of the maskable letters to obtain masked data using the dynamic map. The format preservation based masking system 100 may execute the modules comprising a sorting module that when executed by the hardware processor 104 determines an order of letters in the encrypted letters list, sorts the encrypted letters list from the order of letters to obtain a sorted encrypted letters list and thereby enabling the map generation module to generate a dynamic map based on the sorted encrypted letters list. The dynamic map generated using the sorted encrypted letters list comprises a set of keys and values. Each value comprises one or more rearranged letters to be masked from the set of letters.

The position calculation module then calculates a position of each of maskable letters in the input set of letters using the dynamic map, and the masking module performs masking of the maskable letters based on the position of each of the maskable letters to obtain masked data. When the letters comprising numerals, the map generation module generates a Most Significant Bit (MSB) map for the one or more numerals, thereby enabling the position calculation module to calculate a position of each of maskable letters in the input set of letters using the dynamic map and the MSB map. The masking module then performs masking of the maskable letters based on the position of each of the maskable letters to obtain masked data using the dynamic map and the MSB map.

The modules for example, the input processing module, the encryption module, the map generation module, the position calculation module, the masking module, the sorting module, are implemented as at least one of a logically self-contained part of a software program, a self-contained hardware component, and/or, a self-contained hardware component, with a logically self-contained part of a software program embedded into each of the hardware component that when executed perform the above method described herein, in one embodiment.

Figure 2:
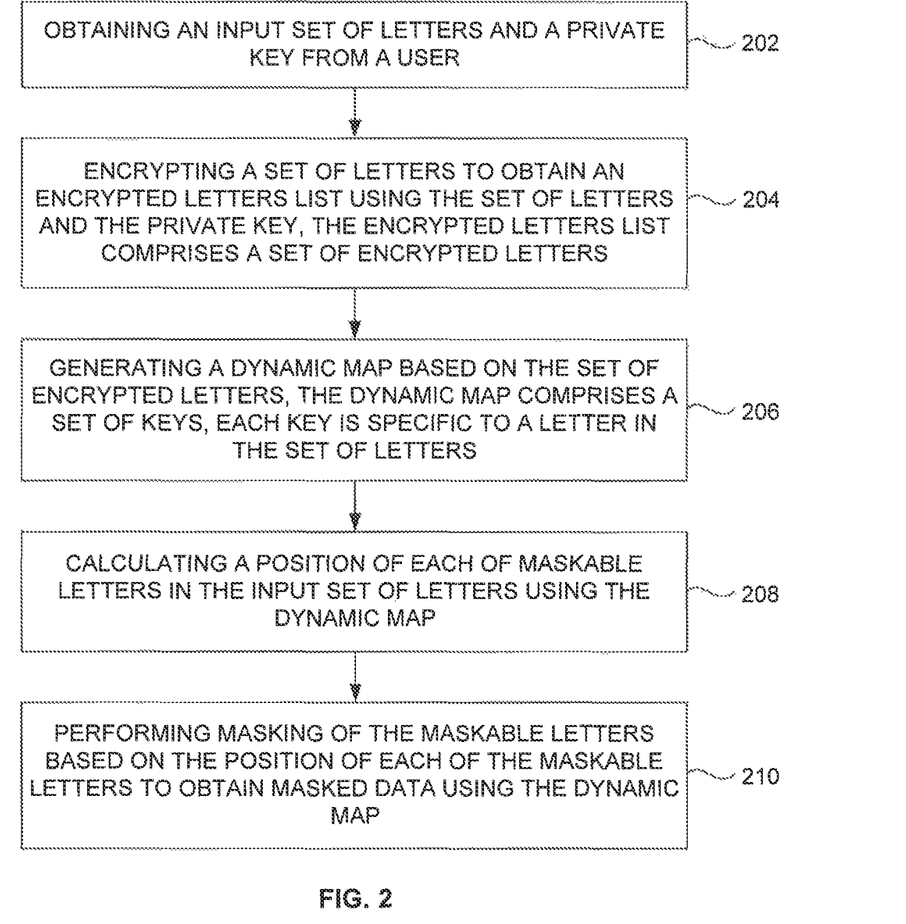
FIG. 2 is a flow diagram illustrating a computer implemented format preservation based masking method using the format preservation based masking system of FIG. 1 according to an embodiment of the present disclosure.

FIG. 2, with reference to FIG. 1, is a flow diagram illustrating a computer implemented format preservation based masking method using the format preservation based masking system 100 of FIG. 1 according to an embodiment of the present disclosure. In step 202, a set of letters and a private key is obtained (e.g., from a user). An input set of letters (e.g., name, address, country name, etc.) is additionally received other than the set of letters (e.g., a, b, c, d, e . . . , x, y, z). The set of letters may be optional, in case, the format preservation based masking system 100 utilizes an English character keyboard, (e.g., in case of a client system using English keyboard). The set of letters are essentially received as input in case of non-English characters, wherein the non-English characters are not stored in the memory 102. However, the set of letters (from one or more languages) may be stored in the memory 102 or obtained from one or more sources (e.g., cloud, remote servers, and/or third party sources), in real-time or near real-time. In step 204, the set of letters are encrypted to obtain an encrypted letters list using the set of letters and the private key. The encrypted letters list comprises a set of encrypted letters.

In step 206, a dynamic map is generated based on (or using) the set of encrypted letters in the encrypted letters list. The dynamic map comprises a set of keys, wherein each key is specific to a letter (e.g., a character) in the set of letters. In step 208, a position of each of maskable letters in the input set of letters is calculated using the dynamic map.

In step 210, masking of the maskable letters is performed based on (or using) the position of each of the maskable letters and the dynamic map to obtain masked data. As described above, when the letters comprise of numerals, the format preservation based masking system 102 generates a MSB map. In other words, the method includes generating a Most Significant Bit (MSB) map for the numerals; calculating a position of each of maskable letters in the input set of letters using the dynamic map and the MSB map; and performing masking of the maskable letters based on the position of each of the maskable letters to obtain masked data using the dynamic map and the MSB map.

The method further includes determining an order of letters in the encrypted letters list; sorting the encrypted letters list from the order of letters to obtain a sorted encrypted letters list; generating a dynamic map based on the sorted encrypted letters list, wherein the dynamic map comprises a set of keys and values, each key is specific to at least one letter in the set of letters, and, each value comprises one or more rearranged letters to be masked from the set of letters; calculating a position of each of maskable letters in the input set of letters using the dynamic map; and perform masking of the maskable letters based on the position of each of the maskable letters to obtain masked data using the dynamic map. When the one or more numerals are indicative of a specified range, the maskable letters comprising the one or more numerals are masked within the specified range.

For better understanding of the embodiments, the present disclosure describes the proposed methodology by way of example as below:

Form dynamic map for set of letters. Consider letters A-Z, a-z, 0-9, user input numerals and alphabets, which are the original input data. As described above, here, the key is the original character whereas the value will contain the following: list-index of the masked character in the sorted masked array, and the sorted masked array pointer. In parallel, form a map where the key is the sorted masked array pointer and the value is the sorted masked array. Form the MSB map for numerals (Numbers other than zero) in the same manner as generated for the dynamic map. Calculate the number of maskable characters (characters present in the dynamic map) and the index of the first maskable character in the original input data. These values will be required in order to preserve the format of the original data. If the first maskable character is a numeral then mask. If this character is zero then it is not masked i.e., keep all the preceding zeros as zero, until a non-zero character is reached (or identified). For example, 1234567890 is masked to 2143658709 as described. 123-456-7890 will also be masked to 214-365-8709 since special character "-" is not present. In the dynamic map, it will bypassed while masking.

Ascertaining the final masked value for any given character is discussed below with an example.

Example: 123-ABC-pqr

| | Character | | | | | | | | | |
|---|---|---|---|---|---|---|---|---|---|---|
| | 1 | 2 | 3 | — | A | B | C | — | p | q | r |
| Index value | 9 | 10 | 11 | | 12 | 13 | 14 | | 15 | 16 | 17 |

The first maskable character is assigned the index value as the total number of maskable characters and for the next succeeding character the index value will be incremented by 1. As mentioned above, this index value will be required as one of the parameter to obtain the final masked character for the original character. The input data is iterated character by character. Since the first character is a numeral so the MSBMap will be generated. For the key '1' the value from the MSBMap will be:
  a. masked char:6
  b. list-index:1
  c. sorted masked array pointer (pointing to a array (5,4,3,2,7,1,8,6,9))

Result index = (index value + list index)%(sorted masked array size)

= (9 + 1)%9

= 10%9

= 1

The character at index value 1 is obtained, which in this case is 5. Similarly, the masked characters for the remaining characters are found using the dynamic map and appended to the masked string. Therefore, the masked output will be 501-GIS-ksj. The format preservation based masking system 100 enables masking of data, particularly, in case where the input comprises one or more numerals, with or without ranges specified.

Figure 3A:
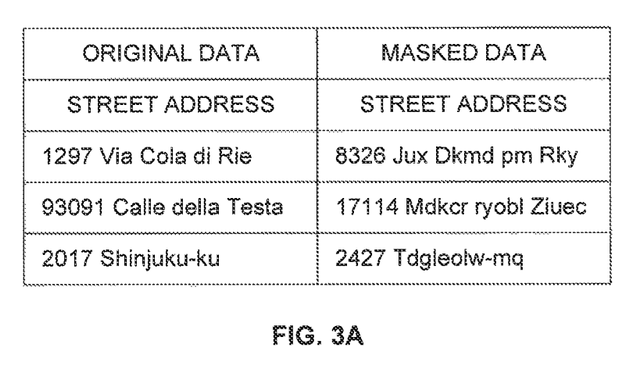
FIG. 3A illustrate comparative exemplary views of the original data and the masked data for a set of letters comprising characters (e.g., street address) according to one or more embodiments of the present disclosure.
Figure 3B:
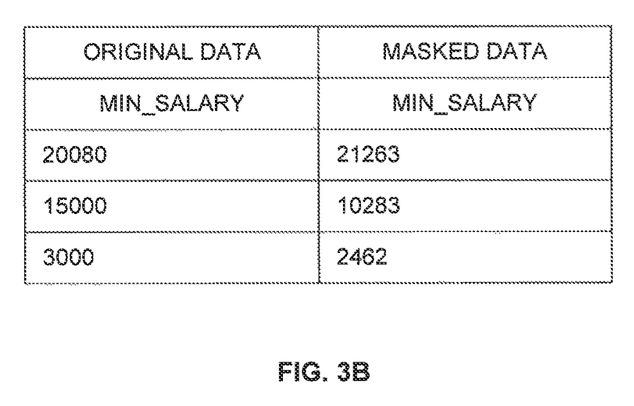
FIG. 3B illustrates an exemplary view of the original data and the masked data for minimum salary with range specified according to one or more embodiments of the present disclosure.

FIG. 3A-3E, with reference to FIG. 1 to 2, illustrates exemplary views of the original data and the masked data according to one or more embodiments of the present disclosure. In particular, FIG. 3A illustrate comparative exemplary views of the original data and the masked data for a set of letters comprising characters (e.g., street address) according to one or more embodiments of the present disclosure. FIG. 3B illustrates an exemplary view of the original data and the masked data for minimum salary (e.g., numerals (salary) received as input for masking data with range specified as Minimum: 1000 and Maximum: 25000) according to one or more embodiments of the present disclosure. Since the range is specified, the output masked data should also lie within this range, and then the user has the provision to enter the range. When the one or more numerals are indicative of a specified range, the maskable letters comprising the one or more numerals are masked within the specified range. In other words, the range is provided by the user at the time of providing letters in case of numeric. The format preservation based masking system 100 masks the numerals within the specified range.

Figure 3C:
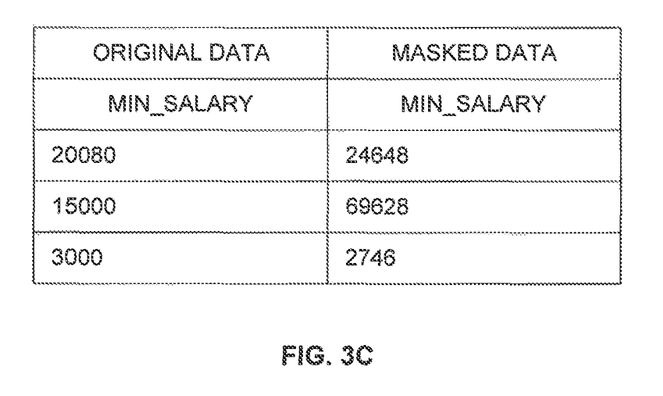
FIG. 3C illustrates an exemplary view of the original data and the masked data for minimum salary without range being specified according to one or more embodiments of the present disclosure.

FIG. 3C illustrates an exemplary view of the original data and the masked data for minimum salary (e.g., numerals received as input for masking data without range being specified) according to one or more embodiments of the present disclosure. When the range is not specified, there could be values out of the input values range. For example the minimum salary 15000 is masked to minimum salary 69628.

Figure 3D:
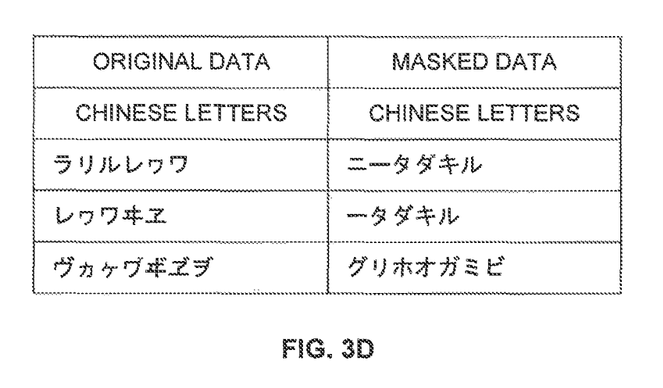
FIG. 3D illustrates an exemplary view of the original data and the masked data for Chinese characters according to one or more embodiments of the present disclosure.
Figure 3E:
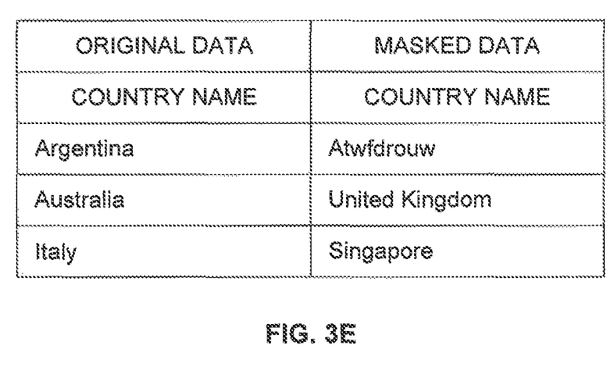
FIG. 3E illustrates an exemplary view of the original data and the masked data for exceptional scenarios indicative of certain values to be masked with predefined values according to one or more embodiments of the present disclosure.

FIG. 3D illustrates an exemplary view of the original data and the masked data for Non-English character according to one or more embodiments of the present disclosure. In particular, FIG. 3D illustrates an exemplary view of the original data and the masked data for Chinese characters. FIG. 3E illustrates an exemplary view of the original data and the masked data for exceptional scenarios where the user has specified that certain values should be masked by pre-defined values. The format preservation based masking system 100 is configured in such a way that Australia should be masked with United Kingdom, and Italy should be masked with Singapore. So, whenever these two values will occur they will get masked by their respective pre-defined values and will not undergo the character replacement masking.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure implements a format preservation based masking system and method that maintains consistency of data at an enterprise level, preserves the format of the input data, ensuring that masked data is not decipherable, leading to data security. The format preservation based masking system 100 further supports non-English characters and numerals. Unlike the conventional systems and methods generate static lookup table which consume more disk space and more time in terms of creating, updating and processing of the data in a presentable that is less secured, the format preservation based masking system 100 dynamically generates maps (e.g., the dynamic map and the Non-MSB and MSB maps, which act as a dynamic lookup table at runtime that are used as reference to perform masking of data results in less disk space consumption (or consuming reduced memory space), and less time in processing and updating the data. Unlike conventional masking tools, the format preservation based masking system 100 calculates position of letter in the input data that plays a vital role in determining the final replace (or masking) for respective letters.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g.

hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A format preservation based masking system, comprising:
   a memory storing instructions;
   a hardware processor coupled to said memory, wherein said hardware processor is configured by said instructions to:
      obtain an input set of letters and a private key from one or more sources and an original data from a user;
      encrypt the input set of letters to obtain a set of encrypted letters list using one or more encryption technique, wherein the one or more encryption technique considers the private key as one of parameter for the encryption;
      generate a dynamic map using the set of encrypted letters list, wherein the dynamic map is generated by mapping the encrypted letters list with the input set of letters, and wherein the dynamic map comprises a set of keys, wherein each key is specific to a letter in the input set of letters;

calculate a position of each of maskable letters in the dynamic map and assign an index value to a first maskable letter based on total number of maskable letters in the dynamic map, wherein the index value is incremented for each of a succeeding maskable letter in the dynamic map; and perform masking of each of the maskable letters using the calculated position of each of said maskable letters to obtain masked data using said dynamic map, the wherein the masked data is based on a position of individual letter in the original data.

2. The format preservation based masking system of claim 1, wherein said set of letters and said input set of letters comprises at least one of a character, a numeric, and a symbol.

3. The format preservation based masking system of claim 1, wherein said set of letters and said input set of letters are selected from one or more languages.

4. The format preservation based masking system of claim 1, wherein when said input set of letters comprises one or more numerals, said hardware processor is further configured by said instructions to:

generate a Most Significant Bit (MSB) map for said one or more numerals, calculate a position of each of maskable letters in said input set of letters using said dynamic map and said MSB map, and perform masking of said maskable letters based on said position of each of said maskable letters to obtain masked data using said dynamic map and MSB map.

5. The format preservation based masking system of claim 1, wherein said hardware processor is further configured by said instructions to:

determine an order of letters in said encrypted letters list, sort said encrypted letters list from said order of letters to obtain a sorted encrypted letters list, generate a dynamic map based on said sorted encrypted letters list, wherein said dynamic map comprises a set of keys and values, each key specific to at least one letter in said set of letters, and, each value comprises one or more rearranged letters to be masked from said set of letters, calculate a position of each of maskable letters in said input set of letters that are to be masked using said dynamic map, and perform masking of said maskable letters based on said position of each of said maskable letters to obtain masked data using the said dynamic map.

6. The format preservation based masking system of claim 1, wherein said dynamic map further comprises an index indicative of masked replace letter for each letter in said set of letters.

7. The format preservation based masking system of claim 4, wherein when said one or more numerals is indicative of a specified range, said maskable letters comprising said one or more numerals are masked within said specified range.

8. A computer implemented format preservation based masking method, comprising:

obtaining an input set of letters and a private key from one or more sources and an original data from a user;

encrypting the input set of letters to obtain a set of encrypted letters list using one or more encryption technique, wherein the one or more encryption technique considers the private key as one of parameter for the encryption;

generating a dynamic map using the set of encrypted letters list, wherein the dynamic map is generated by mapping the encrypted letters list with the input set of letters, and wherein the dynamic map comprises a set of keys, wherein each key is specific to a letter in the input set of letters;

calculating a position of each of maskable letters in the dynamic map and assigning an index value to a first maskable letter based on total number of maskable letters in the dynamic map, wherein the index value is incremented for each of a succeeding maskable letter in the dynamic map; and performing masking of each of the maskable letters using the calculated position of each of said maskable letters to obtain masked data using said dynamic map, the wherein the masked data is based on a position of individual letter in the original data.

9. The computer implemented format preservation based masking method of claim 8, wherein said set of letters and said input set of letters comprises at least one of a character, a numeric, and a symbol, and wherein said set of letters and said input set of letters are selected from one or more languages.

10. The computer implemented format preservation based masking method of claim 8, wherein when said input set of letters comprises one or more numerals, said method comprising:

generating a Most Significant Bit (MSB) map for said one or more numerals; calculating a position of each of maskable letters in said input set of letters using said dynamic map and said MSB map; and performing masking of said maskable letters based on said position of each of said maskable letters to obtain masked data using said dynamic map and said MSB map.

11. The computer implemented format preservation based masking method of claim 8, further comprising:

determining an order of letters in said encrypted letters list;

sorting said encrypted letters list from said order of letters to obtain a sorted encrypted letters list;

generating a dynamic map based on said sorted encrypted letters list, wherein said dynamic map comprises a set of keys and values, each key is specific to at least one letter in said set of letters, and, each value comprises one or more rearranged letters to be masked from said set of letters;

calculating a position of each of maskable letters in said input set of letters that are to be masked using said dynamic map; and perform masking of said maskable letters based on said position of each of said maskable letters to obtain masked data using the said dynamic map.

12. The computer implemented format preservation based masking method of claim 10, wherein when said one or more numerals are indicative of a specified range, said maskable letters comprising said one or more numerals are masked within said specified range.

13. One or more non-transitory machine readable information storage mediums comprising one or more instructions, which when executed by one or more hardware processors causes to perform a computer implemented format preservation based masking method comprising:

obtaining an input set of letters and a private key from one or more sources and an original data from a user;

encrypting the input set of letters to obtain a set of encrypted letters list using one or more encryption technique, wherein the one or more encryption technique considers the private key as one of parameter for the encryption;

generating a dynamic map using the set of encrypted letters list, wherein the dynamic map is generated by mapping the encrypted letters list with the input set of letters, and wherein the dynamic map comprises a set of keys, wherein each key is specific to a letter in the input set of letters;

calculating a position of each of maskable letters in the dynamic map and assigning an index value to a first maskable letter based on total number of maskable letters in the dynamic map, wherein the index value is incremented for each of a succeeding maskable letter in the dynamic map; and performing masking of each of the maskable letters using the calculated position of each of said maskable letters to obtain masked data using said dynamic map, the wherein the masked data is based on a position of individual letter in the original data.

14. The one or more non-transitory machine readable information storage mediums of claim 13, wherein said set of letters and said input set of letters comprises at least one of a character, a numeric, and a symbol.

15. The one or more non-transitory machine readable information storage mediums of claim 13, wherein said set of letters and said input set of letters are selected from one or more languages.

16. The one or more non-transitory machine readable information storage mediums of claim 13, wherein when said input set of letters comprises one or more numerals, said method comprising:

generating a Most Significant Bit (MSB) map for said one or more numerals;

calculating a position of each of maskable letters in said input set of letters using said dynamic map and said MSB map; and performing masking of said maskable letters based on said position of each of said maskable letters to obtain masked data using said dynamic map and said MSB map.

17. The one or more non-transitory machine readable information storage mediums of claim 13, wherein said method further comprises:

determining an order of letters in said encrypted letters list;

sorting said encrypted letters list from said order of letters to obtain a sorted encrypted letters list;

generating a dynamic map based on said sorted encrypted letters list, wherein said dynamic map comprises a set of keys and values, each key is specific to at least one letter in said set of letters, and, each value comprises one or more rearranged letters to be masked from said set of letters;

calculating a position of each of maskable letters in said input set of letters that are to be masked using said dynamic map; and perform masking of said maskable letters based on said position of each of said maskable letters to obtain masked data using the said dynamic map.

18. The one or more non-transitory machine readable information storage mediums of claim 16, wherein when said one or more numerals are indicative of a specified range, said maskable letters comprising said one or more numerals are masked within said specified range.

\* \* \* \* \*